(12) United States Patent
Jahkel et al.

(10) Patent No.: US 9,452,096 B2
(45) Date of Patent: Sep. 27, 2016

(54) WHEELCHAIR WITH TILT CAPABILITY

(71) Applicant: Permobil AB, Timra (SE)

(72) Inventors: Jonas Jahkel, Stockholm (SE); Goran Mansson, Sundsvall (SE); Stefan Nilzen, Sundsvall (SE); Johnny Nordin, Soraker (SE); Rune Stenstrom, Sundsvall (SE); Hakan Bergman, Timra (SE); Magnus Andersson, Sundsvall (SE); Richard Ronngardh, Sundsvall (SE); Ake Melander, Fagervik (SE); Bo Engman, Sundsvall (SE); Adam Karpinski, Nashville, TN (US); Corey Blauch, Nashville, TN (US); Lori Weaver, Nashville, TN (US); Mehdi Mirzaie, Brentwood, TN (US)

(73) Assignee: PERMOBIL AB, Timra (SE)

( * ) Notice: Subject to any disclaimer, the term of this patent is extended or adjusted under 35 U.S.C. 154(b) by 0 days.

(21) Appl. No.: 14/328,066

(22) Filed: Jul. 10, 2014

(65) Prior Publication Data

US 2015/0015043 A1    Jan. 15, 2015

(30) Foreign Application Priority Data

Jul. 12, 2013 (EP) .................................... 13176357

(51) Int. Cl.
*A61G 5/04* (2013.01)
*A61G 5/10* (2006.01)
(Continued)

(52) U.S. Cl.
CPC . *A61G 5/04* (2013.01); *A47C 1/02* (2013.01); *A61G 5/1059* (2013.01); *A61G 5/1075* (2013.01); *B60N 2/10* (2013.01)

(58) Field of Classification Search
CPC .................... A47C 1/02; A47C 1/022; A47C 1/024–1/025; A61G 5/04; A61G 5/1056; A61G 5/1059; A61G 5/107; A61G 5/1075
See application file for complete search history.

(56) References Cited

U.S. PATENT DOCUMENTS 4,545,616 A * 10/1985 Booth .................. A61G 5/1059
297/320
5,203,610 A *  4/1993 Miller ...................... 297/344.16
(Continued)

FOREIGN PATENT DOCUMENTS

| CH | 697181 A5 | 6/2008 |
|---|---|---|
| EP | 0468686 A1 | 1/1992 |
| EP | 2050424 A1 | 4/2009 |

OTHER PUBLICATIONS

European Search Report, Application No. EP13176357.5, mailing date Jan. 8, 2014, 6 pages.

*Primary Examiner* — Emma K Frick
(74) *Attorney, Agent, or Firm* — McAndrews, Held & Malloy, Ltd.

(57) ABSTRACT

The present disclosure relates to a wheelchair (1) with tilt capabilities. The electric wheelchair comprises a chassis (3), a lift device having a base member which is fixedly arranged to the chassis, and a lifting member arranged to move rectilinearly relative to the base member along an axis defined by a longitudinal extension of the lifting member, a tilt frame, a first arm pivotally coupled to the lifting member and the tilt frame, and a second arm coupled to the base member, and which second arm is pivotally coupled to the first arm forming a pivot connection, wherein movement of the lifting member towards the extended position moves the pivot connection towards the base member and movement of the lifting member towards the retracted position moves the pivot connection away from the base member.

40 Claims, 14 Drawing Sheets

(51) Int. Cl.
*A47C 1/02* (2006.01)
*B60N 2/10* (2006.01)

(56) References Cited

U.S. PATENT DOCUMENTS

| | | | |
|---|---|---|---|
| 5,971,482 A * | 10/1999 | Goertzen et al. | 297/329 |
| 5,996,716 A * | 12/1999 | Montiglio et al. | 180/65.51 |
| 6,032,976 A * | 3/2000 | Dickie et al. | 280/650 |
| 6,217,114 B1 * | 4/2001 | Degonda | 297/325 |
| 6,619,735 B1 * | 9/2003 | Ming-Hwa | 297/170 |
| 6,715,784 B2 * | 4/2004 | Koerlin et al. | 280/650 |
| 8,297,641 B2 * | 10/2012 | Landry et al. | 280/647 |
| 8,783,770 B2 * | 7/2014 | Tanaka et al. | 297/316 |
| 9,033,360 B2 * | 5/2015 | Davis et al. | 280/647 |
| 2007/0102615 A1 * | 5/2007 | Engman | 248/371 |
| 2012/0146301 A1 | 6/2012 | Horvath et al. | |

* cited by examiner

WHEELCHAIR WITH TILT CAPABILITY

This application claims priority to European Patent Application Number 13176357.5, which was filed Jul. 12, 2013, and which is incorporated herein by reference in its entirety.

TECHNICAL FIELD

The present disclosure generally relates to a wheelchair and in particular to a wheelchair arranged to enable tilt of the wheelchair seat.

BACKGROUND

Electric wheelchairs are commonly fitted with a tilt arrangement which allows adjustment of the orientation and/or the height of the wheelchair seat. Such adjustment may be anterior, i.e. forward, posterior, i.e. backwards, tilting and/or lifting of the seat. A seat occupant or caretaker may thereby for example set the seat position according to desire or current need of the occupant. Moreover, adjustment of the seat orientation may be a desirable feature for control purposes to stabilise the wheelchair depending on speed and travel on inclined surfaces.

EP1997466 discloses a wheelchair which provides posterior tilt, anterior tilt, full standing anterior tilt and lift. For this purpose, the wheelchair comprises a plurality of interacting actuators and levers. A first actuator is arranged to actuate a pivotable lever which is provided with a second actuator. Interaction between the first actuator and the pivotable lever provides posterior tilt, and further interaction with the second actuator enables lift and anterior tilt.

CH697181 A5 discloses a seating unit for use in wheel chairs. The seating unit sits on a carriage frame and is built as a separate unit from the frame. The seating unit comprises a seating surface, a back support and leg supports on an upright frame and can be adjusted via a first aggregate or manually adjustable upright mechanism for lifting the upright frame in a standing position or lowering it to a seating position.

One problem with existing solutions is that upon tilting, especially posterior tilt, the centre of gravity of an occupant is not maintained which may render transportation with the wheelchair unstable, subjecting the wheelchair and its occupant to the risk of tipping over.

SUMMARY

In view of the above, a general object of the present disclosure is to provide a wheelchair which solves or at least mitigates the problems of the prior art.

According to a first aspect of the present disclosure there is provided an electric wheelchair comprising: a chassis; a lift device having a base member which is fixedly arranged to the chassis, and a lifting member arranged to move rectilinearly relative to the base member along an axis defined by a longitudinal extension of the lifting member; a tilt frame, a first arm pivotally coupled to the lifting member and the tilt frame, and a second arm coupled to the base member, and which second arm is pivotally coupled to the first arm forming a pivot connection, wherein movement of the lifting member towards the extended position moves the pivot connection towards the base member and movement of the lifting member towards the retracted position moves the pivot connection away from the base member.

An effect which may be obtainable by the pivotal coupling between the lifting member and the first arm, and the pivotal coupling of the first arm and the second arm which forms a pivot connection that is moveable relative to the base member is that adjustment of the orientation of the tilt frame provides less change of the point of gravity of a wheelchair occupant thus rendering the electric wheelchair more stable during tilt, especially during posterior tilt. Moreover, a more compact tilt arrangement may be provided compared to the prior art, providing more flexibility for battery placement on the chassis.

According to one embodiment the pivotal coupling of the first arm with the lifting member and the pivotal coupling of the first arm with the tilt frame are spaced apart.

One embodiment comprises a distancing member arranged to distance the first arm from the tilt frame.

According to one embodiment a pivot axis defined by the pivotal coupling of the first arm with the lifting member is perpendicular to and offset from the axis defined by the longitudinal extension of the lifting member.

According to one embodiment the first arm forms a linkage comprising a first portion and a second portion, wherein the first portion extends between the coupling with the second arm and the coupling with the lifting member, and the second portion extends between the coupling with the lifting member and the coupling with the tilt frame.

According to one embodiment the first portion only extends at a first side of the axis defined by the longitudinal extension of the lifting member.

According to one embodiment the second portion intersects the axis defined by the longitudinal extension of the lifting member.

According to one embodiment the first arm is coupled to the lifting member at an end portion of the lifting member.

According to one embodiment the distancing member is pivotally coupled to the first arm.

According to one embodiment the distancing member is pivotally coupled to the tilt frame.

According to one embodiment the distancing member is a tilt actuator extendable to increase the distance between the first arm and the tilt frame.

One embodiment comprises a standing actuator arranged to move, in a plane defined by the tilt frame, an end of the distancing member which is coupled to the tilt frame.

According to one embodiment the second arm is fixedly arranged to the base member.

According to one embodiment the pivotal coupling between the first arm and the second arm is defined by a slidable connection.

According to one embodiment the second arm is pivotally coupled to the base member, and wherein the first arm and the second arm are pivotally coupled to each other.

According to one embodiment the first arm comprises a first arm part and a second arm part, wherein each of the first arm part and the second arm part is pivotally coupled to the lifting member and the tilt frame, and to the second arm to thereby form the pivot connection.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
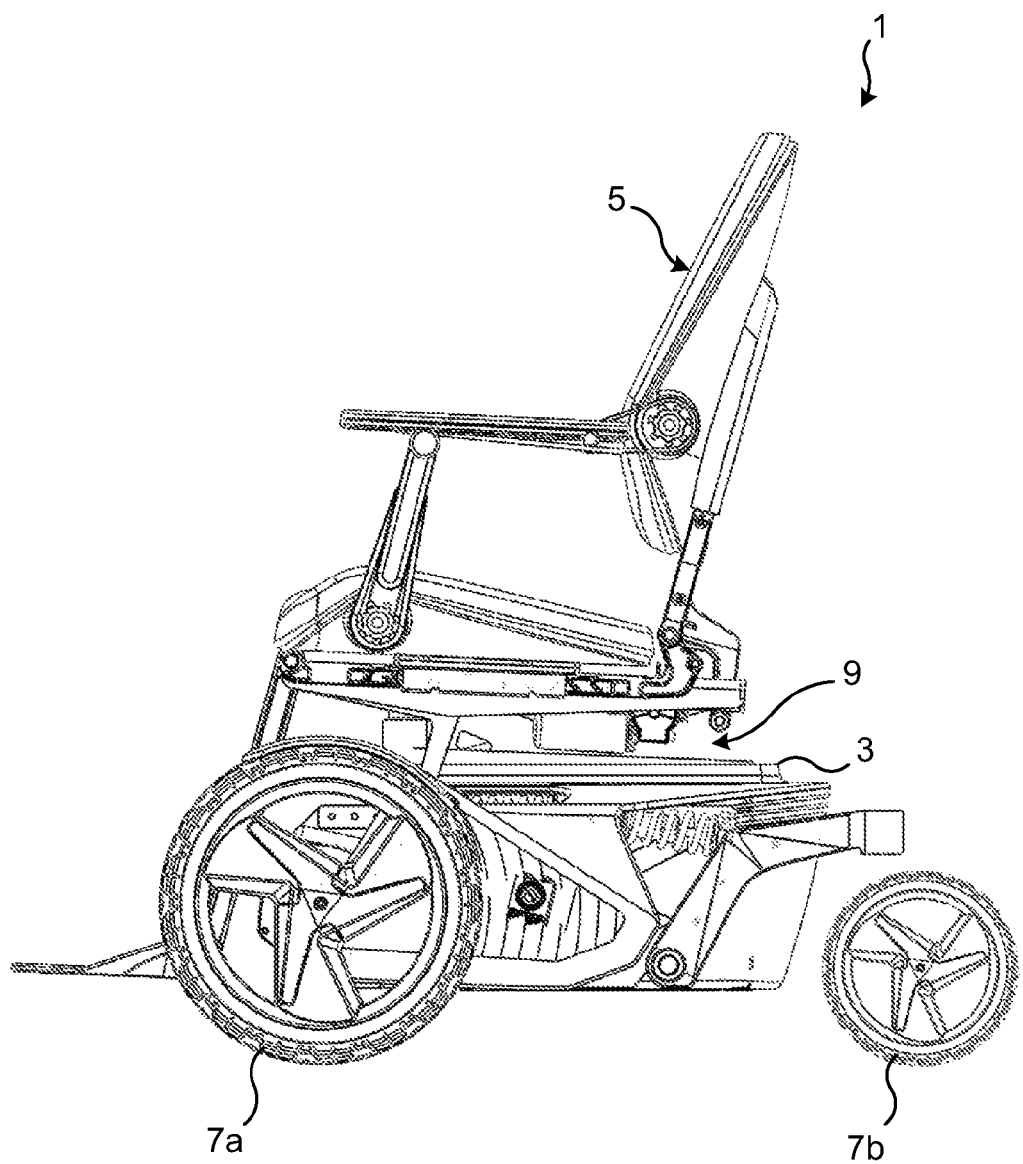
FIG. 1 is a schematic side view of an electric wheelchair comprising a tilt arrangement.

FIG. 1 depicts a schematic side view of an example of an electric wheelchair 1. The wheelchair 1 comprises a chassis 3, a seat 5, wheels 7a and 7b and a tilt arrangement 9 on which the seat 5 is arranged. The exemplified wheelchair 1 is of front wheel drive type. It should however be noted that the wheelchair could be of any wheel drive type such as midwheel drive type, back wheel drive type, four wheel drive type or six wheel drive type.

The electric wheelchair 1 comprises a battery and a motor which are attached to the chassis 3. The battery may be electrically coupled to the motor wherein the motor is mechanically coupled to the wheels 7a and 7b for driving the electric wheelchair 1.

The tilt arrangement 9 may be operable by means of the motor and may, depending on the particular implementation, provide one of anterior tilt, posterior tilt, full standing tilt, and lift, or a combination of anterior/posterior tilt, full standing tilt and lift, as will be explained in this disclosure. In FIG. 1, the tilt arrangement 9 is in a lowered, folded state.

Figure 2:
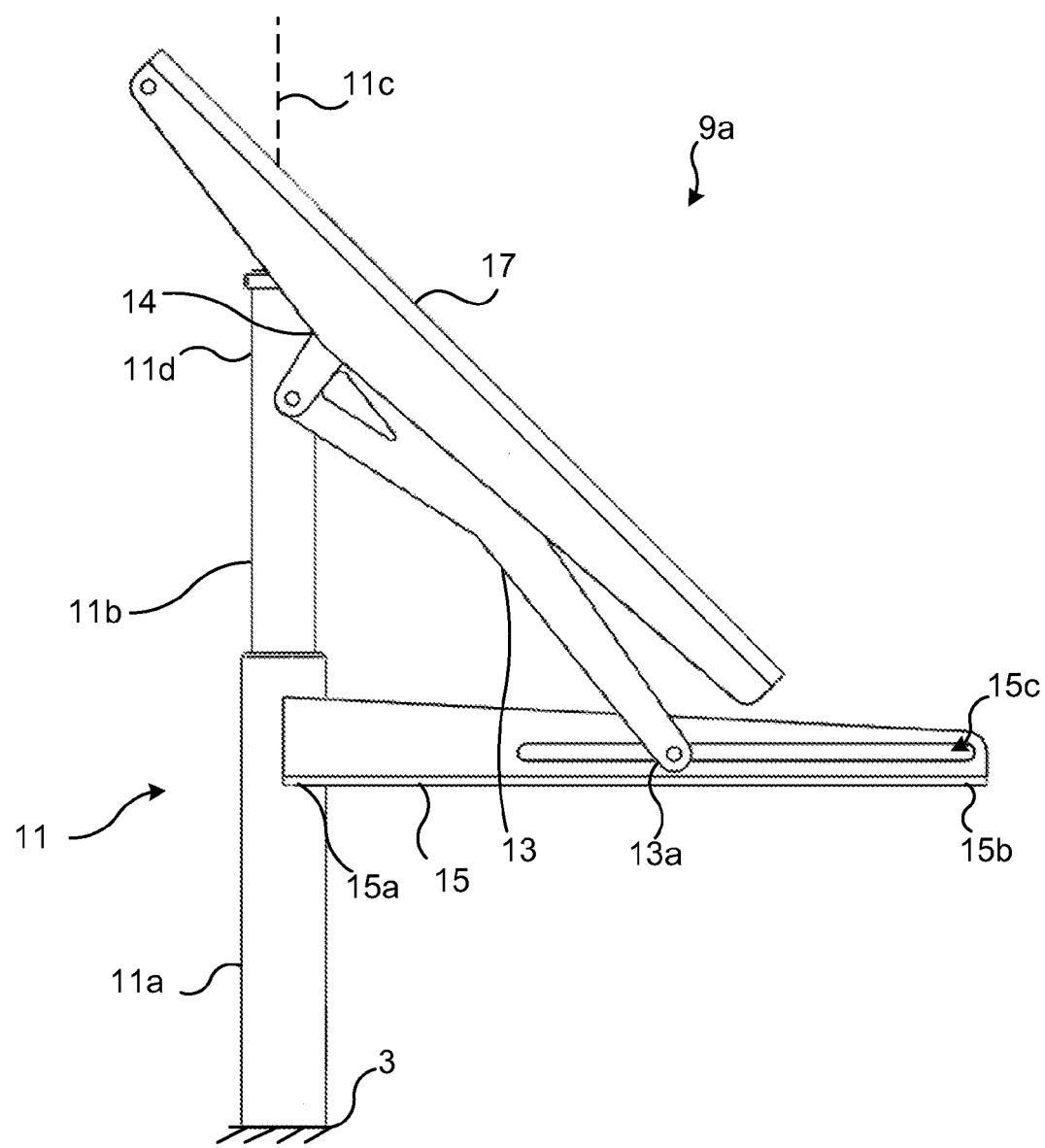
FIG. 2 depicts a first example of a tilt arrangement.

Examples of tilt arrangement 9 and their functionality will in the following be provided with reference to FIGS. 2-8. FIG. 2 depicts a first example of a tilt arrangement 9a. When properly mounted to the chassis 3 of the electric wheelchair 1, the tilt arrangement 9a enables posterior tilt, i.e. backwards tilt of the seat 5.

The tilt arrangement 9a comprises a lift device 11. The lift device 11 has a base member 11a arranged to be fixed to the chassis 3. The lift device 11 has a lifting member 11b arranged to move rectilinearly relative to the base member 11a, along an axis 11c defined by the longitudinal extension of the lifting member 11b. The base member 11a may for example be arranged to accommodate the lifting member 11b such that the lifting member 11b may run in the base member 11a.

The lifting member 11b is arranged to move rectilinearly between a lowered position in which the lifting member 11b is retracted relative to the base member 11a, and an elevated or lifted position in which the lifting member 11b is extended relative to the base member 11a. Actuation of the lifting member 11b may for example be performed by means of the motor of the electric wheelchair 1.

The tilt arrangement 9a further comprises a first arm 13, a second arm 15 and a tilt frame 17. The tilt frame 17 is arranged to support a seat. The first arm 13 is pivotally coupled to an end portion 11d of the lifting member 11b and slidably connected to the second arm 15. The first arm 13 is furthermore pivotally coupled to the tilt frame 17 forming a tilt joint 14.

The second arm 15 is fixedly arranged to the base member 11a. In particular, the second arm 15 has a proximal end 15a and a distal end 15b, wherein the proximal end 15a is fixedly attached to the base member 11a and the distal end 15b which faces away from the base member 11a may form a free end.

According to one variation, a pivot axis, i.e. the tilt joint 14, defined by the pivotal coupling of the first arm 13 with the lifting member 11b is perpendicular to and offset from the axis 11c defined by the longitudinal extension of the lifting member 11b. The tilt joint 14 is hence distanced from the axis 11c, on a first side of the lifting member 11b, which is the side at which the second arm 15 extends, in a direction from the proximal end 15a to the distal end 15b, from the base member 11a. The pivot axis may alternatively be aligned with the axis defined by the longitudinal extension of the lifting member, for example by providing the pivotal coupling between the first arm and the lifting member at the distal end face, i.e. the top, of the lifting member.

According to the first example, the second arm has a slot 15c which extends between the proximal end 15a and the distal end 15b. The slot 15c is perpendicular or essentially perpendicular to the base member 11a and thus the axis 11c. The first arm 13 has a slot interaction member 13a slidably arranged in the slot 15c such that the first arm 13 may slide between the two ends of the slot 15c. The length of the slot 15c is dimensioned such that when the lifting member 11b is maximally retracted and in the lowered state, the slot interaction member 13a is located at a distal slot end with respect to the base member 11a and when the lifting member is maximally extended and in the elevated or lifted position the slot interaction member 13a is located at a proximal slot end with respect to the base member 11a. The slot interaction member 13a hence provides a translatable pivot point of the first arm 13 relative to the second arm 15.

The tilt arrangement 9a forms a tilt mechanism. The tilt frame 17 is essentially perpendicular to the axis 11c and the base member 11a when the lifting member 11b is maximally retracted. When tilting, the tilt frame 17 tilts with an angle which is dependent of the amount of extension of the lifting member 11b.

Figure 3A:
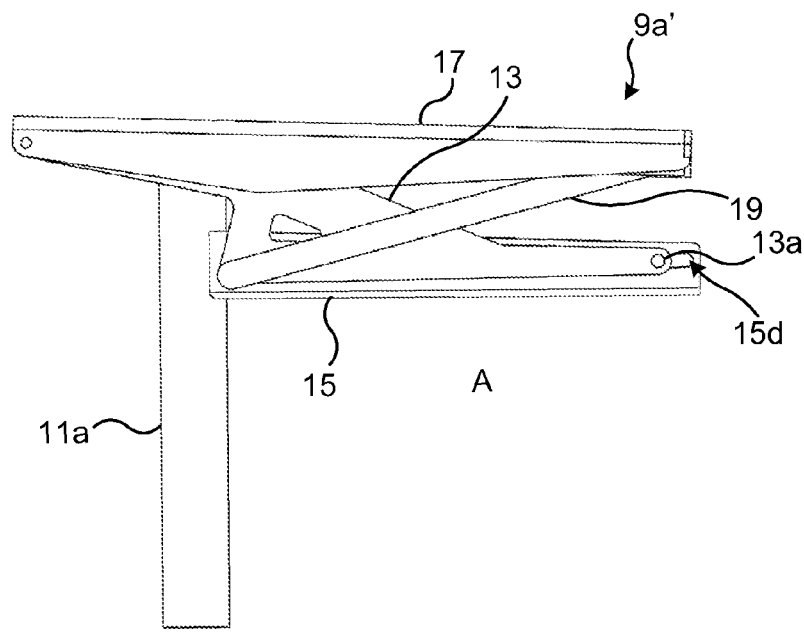
FIGS. 3a-b show the operation of a variation of the first example of the tilt arrangement in FIG. 2.

The tilt arrangement may according to one variation comprise a distancing member 19, as shown in FIG. 3a which depicts a tilt arrangement 9a'. The distancing member 19 is arranged to distance the first arm 13 from the tilt frame 17, especially that end of the tilt frame 17 which is farthest away from the lifting member 11a to thereby obtain a tilt frame which is essentially parallel with the slot 15c when the lifting member 11b is maximally retracted.

The operation of tilt arrangement 9a', which is identical in operation to tilt arrangement 9a, will now be described with reference to FIGS. 3a and 3b. In FIG. 3a, the tilt arrangement 9a' is in a folded or lowered position A in which the lifting member 11b is fully retracted and the slot interaction member 13a of the first arm 13 is arranged at a distal slot end 15*d* of slot 15*c*. A distancing member 19 is arranged to distance the first arm 13 from the tilt frame 17. The distancing member 19 is arranged to maintain an essentially perpendicular position of the tilt frame 17 relative to the base member 11*a* and an essentially parallel position relative to the second arm 15 when the tilt arrangement 9*a'* is in the lowered position A.

Figure 3B:
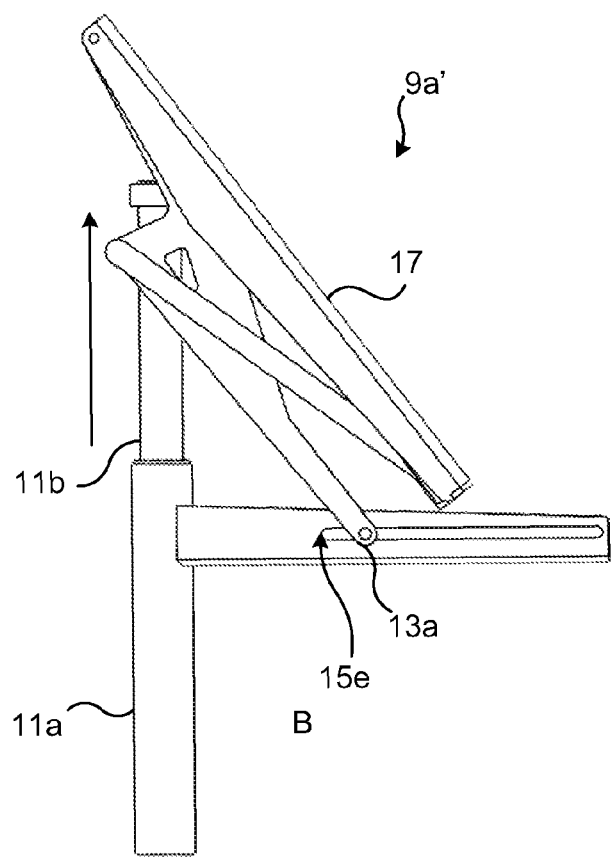

In FIG. 3*b*, the lifting member 11*b* has been moved rectilinearly relative to the base member 11*a* such that the lifting member 11*b* has attained its maximal elevated or lifted position. The tilt arrangement 9*a'* thus obtains a maximal tilting position B. Posterior tilt of the tilt frame 17 is thus obtained. As the tilt arrangement moves from the folded or lowered position A to the maximal tilting position B, the slot interaction member 13*a* moves continually along the slot 15*c* from the distal slot end 15*d* towards a proximal slot end 15*e*. When the slot interaction member 13*a* reaches the proximal slot end 15*e*, the tilt arrangement 9*a* attains its maximal tilting position B. The slot interaction member 13*a* may be fixed at any position between the distal slot end 15*d* and the proximal slot end 15*e* to obtain any inclination of the tilt frame 17 between folded or lowered position A and the maximal tilting position B. The position of the slot interaction member 13*a* is determined by the amount of the extension of the lifting member 11*b* relative to the base member 11*a*, and may for example be controlled by means of the motor of the wheelchair.

Figure 4:
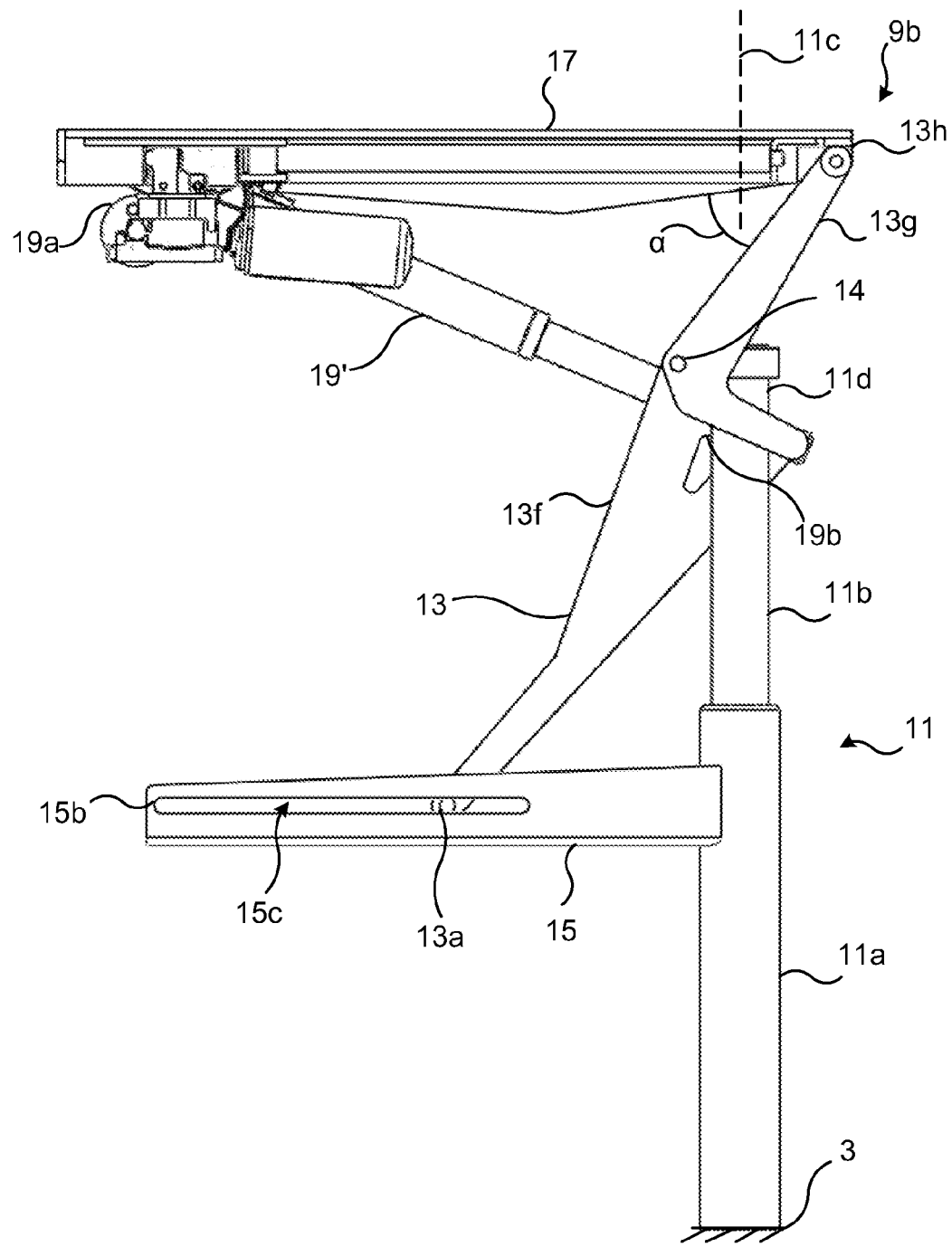
FIG. 4 depicts a second example of a tilt arrangement.

With reference to FIG. 4, a second example of a tilt arrangement is shown. Tilt arrangement 9*b* is in many ways identical to tilt arrangements 9*a* and 9*a'* previously described. The tilt arrangement 9*b* has additional functionality compared to tilt arrangements 9*a*, 9*a'*. Tilt arrangement 9*b* can additionally provide anterior tilt, i.e. forward tilt, and lift of the tilt frame 17, and thus of a seat mounted to the tilt frame 17.

Tilt arrangement 9*b* comprises a distancing member 19' in the form of a tilt actuator arranged to move rectilinearly between a retracted position and an extended position. The tilt actuator may for example be a hydraulic, pneumatic, electrical or a mechanical actuator, or a combination of two or more of the mentioned types of actuators. The distancing member 19' is pivotally coupled to the tilt frame 17 forming a pivot joint 19*a*, and to the lifting member 11*b* or the first arm 13 forming a pivot joint 19*b*.

The pivotal coupling of the first arm 13 with the lifting member 11*b* and the pivotal coupling of the first arm 13 with the tilt frame 17 are spaced apart. According to one variation, the first arm 13 forms a linkage comprising a first portion 13*f* and a second portion 13*g*. The first portion 13*f* extends between the pivotal coupling of the first arm 13 with the second arm 15 and the pivotal coupling of the first arm 13 with the lifting member 11*b*. The second portion 13*g* extends between the pivotal coupling of the first arm 13 with the lifting member 11*b* and the pivotal coupling of the first arm 13 with the tilt frame 17. The coupling between the second portion 13*g* and the tilt frame 17 forms a pivot joint 13*h*. According to one variation, the second portion 13*g* and the tilt frame 17 are pivotally coupled at a respective end forming an angle α therebetween. The angle α can be varied by means of the distancing member 19' between about 0° to about 90°.

According to the depicted example, the first portion 13*f* only extends at a first side of the axis 11*c* defined by the longitudinal extension of the lifting member 11*b*, or at least has its main extension at the first side of the axis 11*c*. Especially, the coupling between the first arm 13 and the lifting member 11*b* is provided at the first side of the axis 11*c*, i.e. that side of the base member 11*a* from which the second arm 15 extends towards its distal end 15*b*. The second portion 13*g* intersects the axis 11*c* and thus extends beyond the lifting member 11*b*. By appropriately dimensioning the length of the first portion 13*f*, the amount of tilt may be defined. By appropriately dimensioning the length of the second portion 13*g*, and thus the portion which extends beyond the lifting member 11*b*, additional lift compared to that lift provided by the lifting member 11*b* may be provided.

Figure 5A:
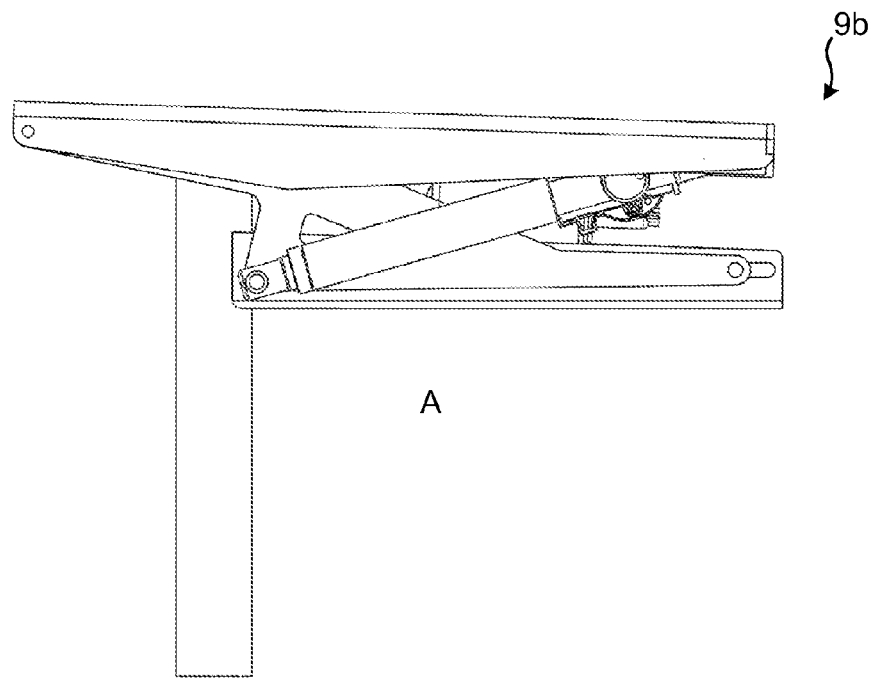
FIGS. 5a-d show the operation of the tilt arrangement in FIG. 4.
Figure 5B:
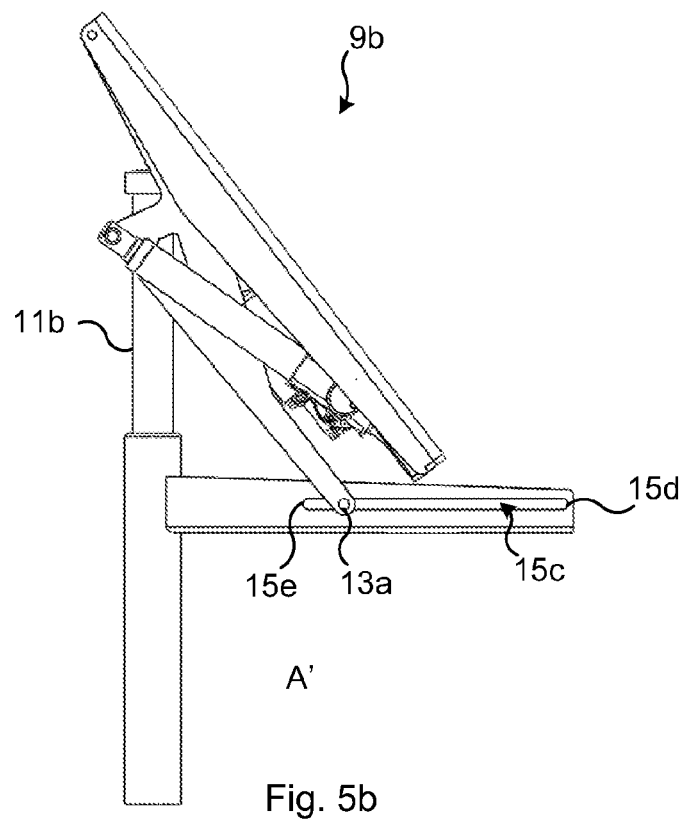

The operation of the tilt arrangement 9*b* will now be described with reference to FIGS. 5*a*-5*d*. In FIG. 5*a*, the tilt arrangement 9*b* is in the folded or lowered position A. The slot interaction member 13*a* is positioned at, or close to, the distal slot end 15*d* of the slot 15*c* of the second arm 15. In FIG. 5*a*, the slot interaction member 13*a* has been moved from the distal slot end 15*d* towards the proximal slot end 15*e* as the lifting member 11*b* has moved rectilinearly towards its maximally extended position. The tilt arrangement 9*b* hence obtains a tilted position A', which is a posterior tilt.

Figure 5C:
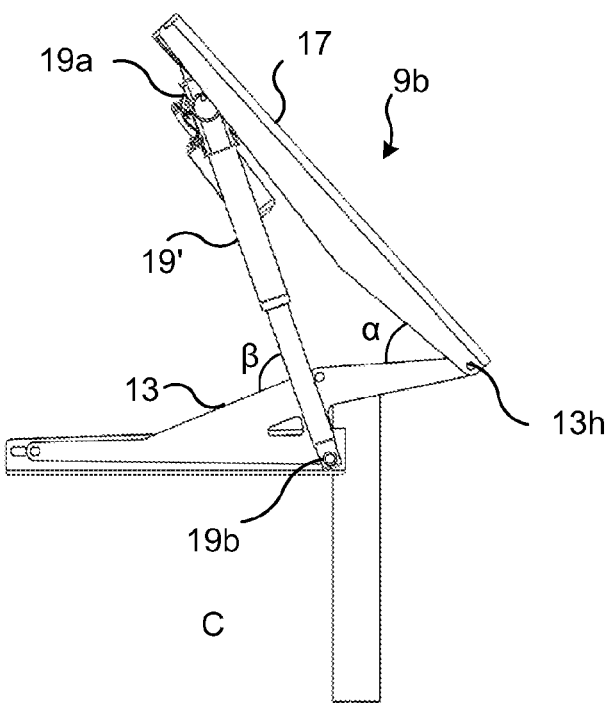

FIG. 5*c* depicts an anterior tilt position C of the tilt arrangement 9*b*. The angles of the distancing member 19' at the pivoting joints 19*a* and 19*b*, the extension of the distancing member 19', and the position of the lifting member 11*b* determines the amount of anterior tilt. When the lifting member 11*b* is maximally retracted, i.e. in its lowered position, the distancing member 19' or tilt actuator is in its maximal extended position, and when an angle β between the distancing member 19' and the first arm 13 in a direction from the slot interaction member 13*a* towards the coupling between the first arm 13 and the lifting member 11*b* is maximal, the tilt frame 17 is subjected to maximal anterior tilt. Actuation of the distancing member 19' between its maximal retraced and extended positions adjusts the angle α between the tilt frame 17 and the first arm 13 at the pivot joint 13*h*. Adjustment of the angle β between the distancing member 19' and the first arm 13 also adjusts the angle α between the tilt frame 17 and the first arm 13 at the pivot joint 13*h*.

Figure 5D:
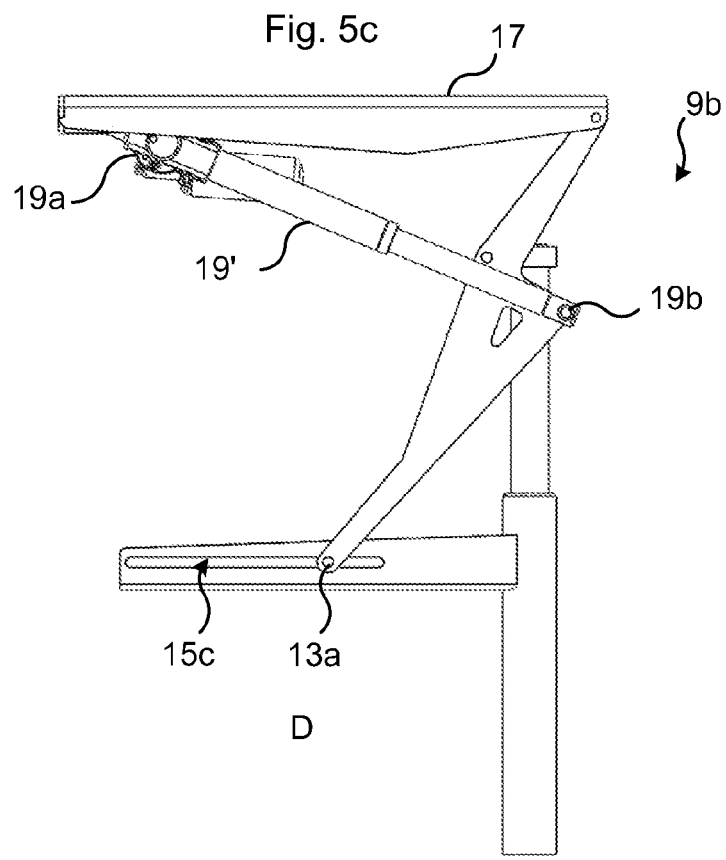

In FIG. 5*d*, the tilt arrangement 9*b* is in an elevated or lifted state D. The elevated or lifted state D is obtained by extending the lifting member 11*b* and by extending the distancing member 19'. The tilt frame 17 may thereby be arranged essentially perpendicular to the axis 11*c* illustrated in FIG. 2 and defined by the longitudinal extension of the lifting member 11*b*. The tilt frame 17 is hence parallel with or essentially parallel with the slot 15*c*.

Figure 6:
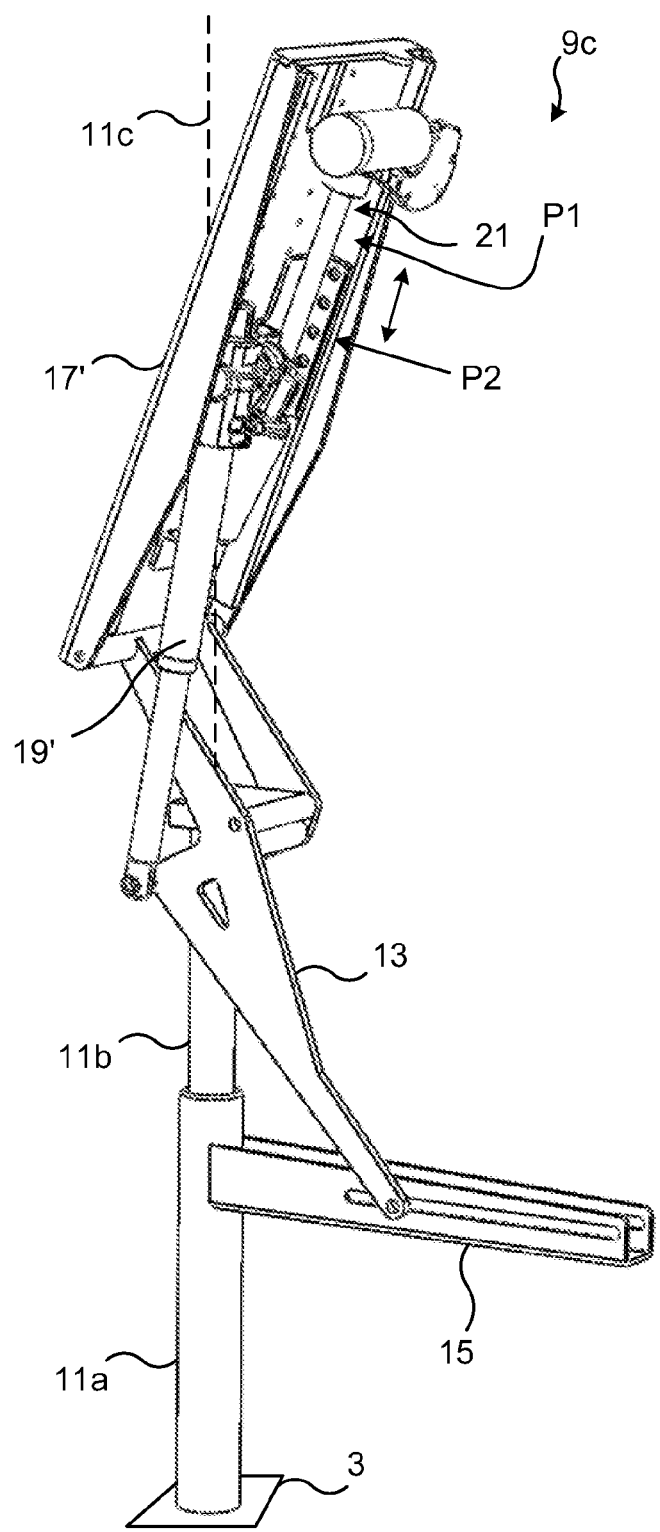
FIG. 6 illustrates a third example of a tilt arrangement.

FIG. 6 shows a third example of a tilt arrangement. Tilt arrangement 9*c* is in many ways identical to tilt arrangement 9*b* but provides the additional functionality of full standing position of the tilt frame. Tilt arrangement 9*c* further comprises a standing actuator 21. The standing actuator 21 is arranged to move or translate, in a plane defined by tilt frame 17', that end of the distancing member 19' which is pivotally coupled to the tilt frame 17'. In particular, the standing actuator may be arranged in the tilt frame 17' and arranged to provide a rectilinear motion in the plane defined by the tilt frame 17'. The standing actuator 21 is arranged to move between a first position P1 in which anterior tilt of the tilt frame 17 may be provided in combination with proper positioning of the lifting member 11*b* and the distancing member 19', and a second position P2 in which a full anterior standing position of the tilt frame 17 may be obtained. The first position P1 is farther away from the axis 11*c* and the pivotable coupling between the first arm 13 and the tilt frame 17 than the second position P2.

Figure 7A:
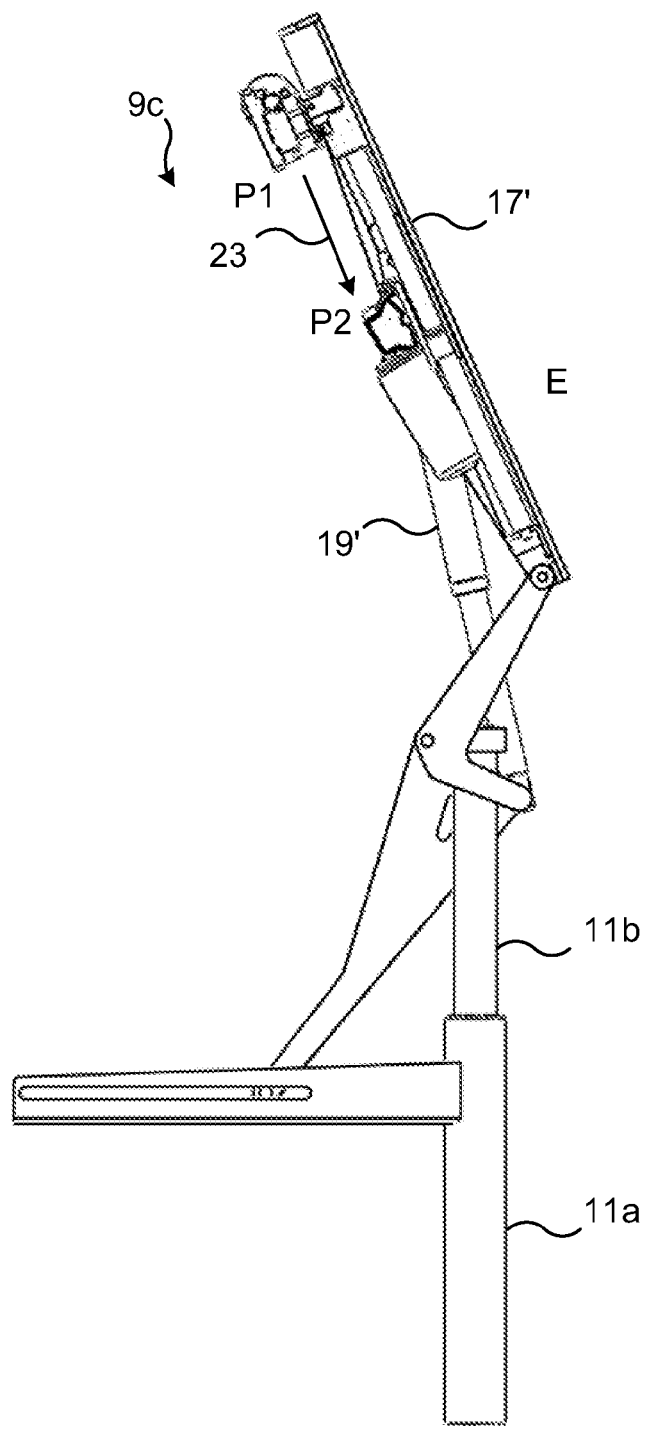
FIG. 7a shows the operation of the tilt arrangement in FIG. 6.

In FIG. 7a, a longitudinal section of the tilt arrangement 9c is shown. The tilt frame 17' is set in a full standing position E. As shown by arrow 23, the standing actuator 21 has translated one end of the distancing member 19' from the first position P1 to the second position P2 in a plane defined by the tilt frame 17' to obtain the full standing position E. By maximal extension of the distancing member 19' the tilt frame 1 may obtain a full standing position E, which is a full anterior tilt position.

Figure 7B:
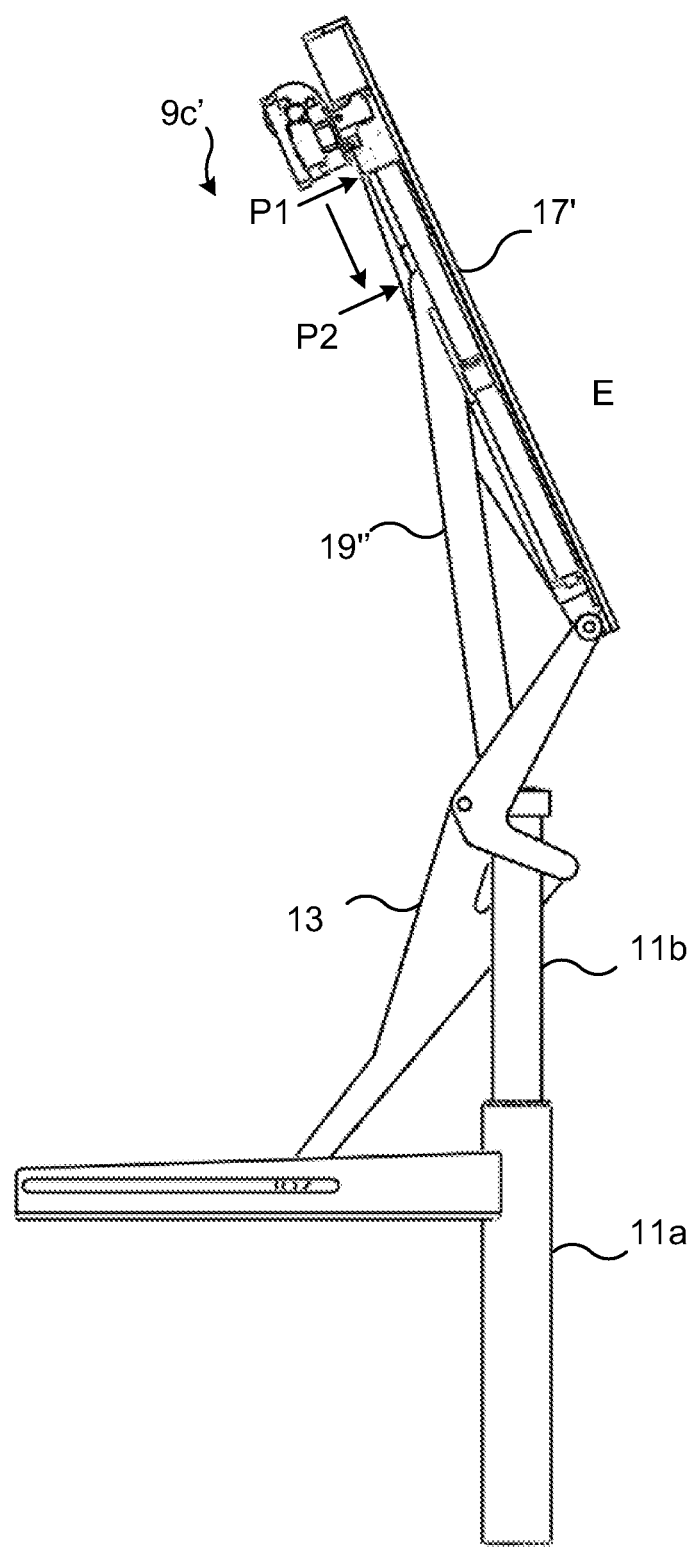
FIG. 7b shows the operation of a variation of the tilt arrangement in FIG. 6.

FIG. 7b depicts a longitudinal section of a variation of the tilt arrangement 9c in full standing position. Tilt arrangement 9c' has as distancing member 19'' which is an arm. Distancing member 19'' is thus not an actuator. One end of the distancing member 19'' is pivotally coupled to the standing actuator 21. The other end of the distancing member 19'' is pivotally coupled to the lifting member 11b. By actuation of the standing actuator 21'' from the first position P1 of the standing actuator 21 to its second position P2, full standing position E may be obtained. The tilt arrangement 9c' is able to provide, in addition to full standing position, lift, and anterior and posterior tilt of the tilt frame 17' according to the same principles as has been described hereabove.

Figure 8:
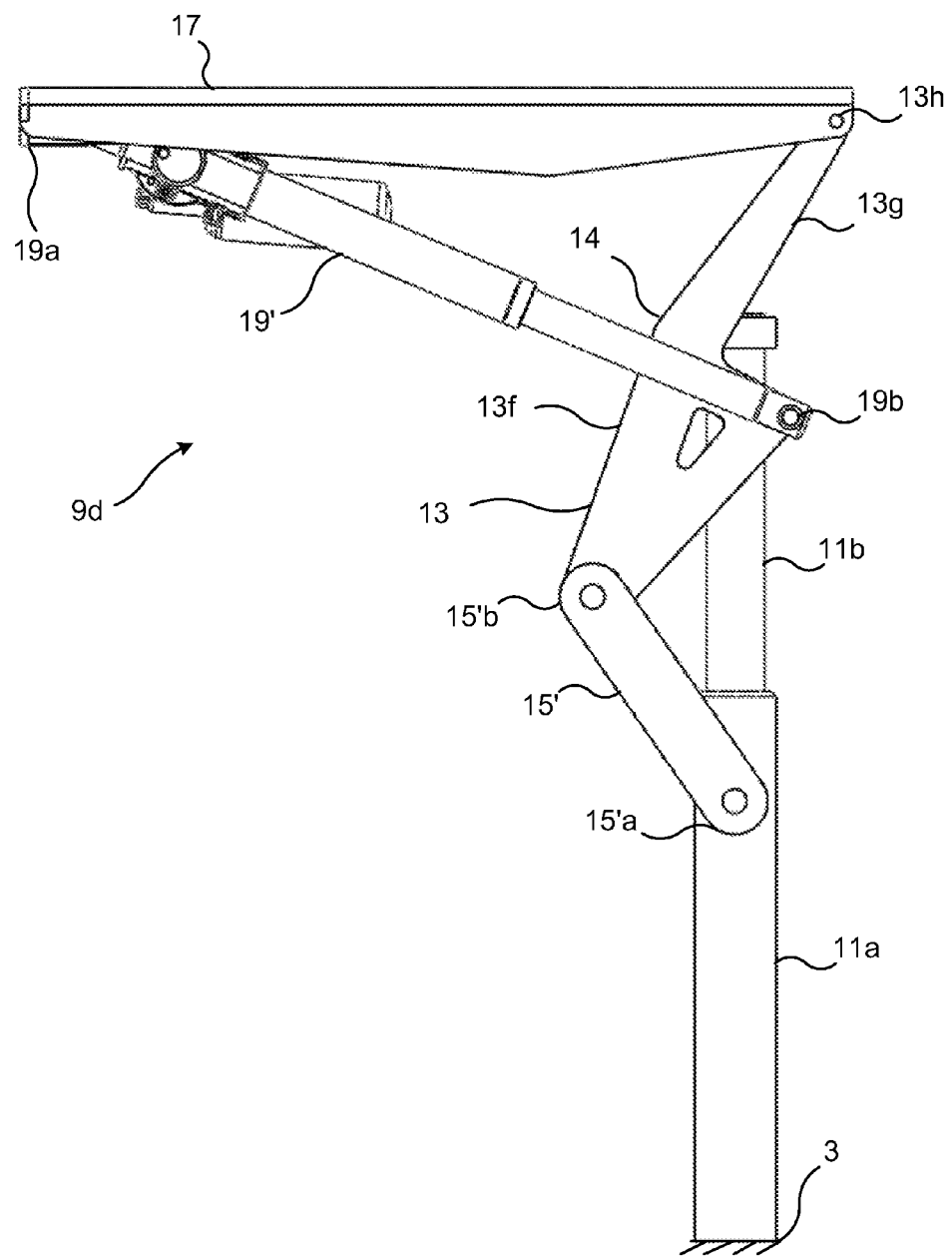
FIG. 8 depicts a fourth example of a tilt arrangement.

FIG. 8 depicts a fourth example of a tilt arrangement. Tilt arrangement 9d is in many ways identical to tilt arrangement 9b. According to one variation the tilt arrangement 9d is provided with the standing actuator of tilt arrangement 9c, and according to another variation it is not provided with the standing actuator.

Tilt arrangement 9d differs from tilt arrangements 9b and 9c in that tilt arrangement 9d comprises a second arm 15' which is pivotally coupled to the first arm 13 and to the base member 11a. That portion of the first arm 13 which extends between the pivotal coupling with the second arm 15' and the pivotal coupling with the lifting member 11b has the same length as that part of the second arm 15' which extends between the pivotal coupling with the first arm 13 and the pivotal coupling with the base member 11a. This arrangement provides an effect which is similar to that provided by the sliding interaction between the slot 15c and the slot interaction member 13a of the previous examples. The pivotal coupling between the first arm 13 and the second arm 15' is hence arranged to move towards the lifting member 11b when the lifting member 11b is extended, and to move away from the lifting member 11b when the lifting member 11b is retracted.

The second arm 13' has a proximal end 13'a which is pivotally coupled to the base member 11a and a distal end 13'b which is pivotally coupled to the first arm 13. The first arm 13 and the second arm 13' form a linkage which together with the distancing member 19' determines whether the tilt arrangement 9d is folded, provides anterior tilt, posterior tilt, and optionally full standing anterior tilt, when the tilt frame is provided with a standing actuator.

Figure 9A:
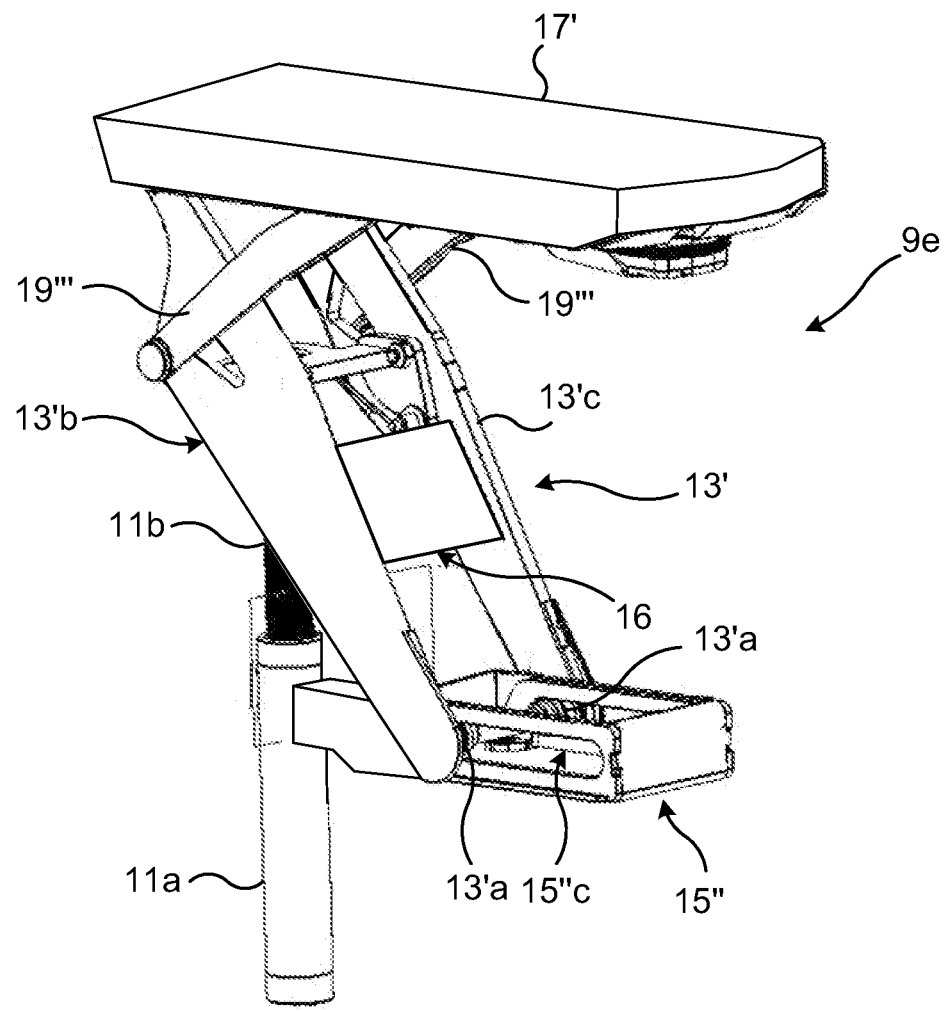
FIGS. 9a and 9b depict a fifth example of a tilt arrangement.
Figure 9B:
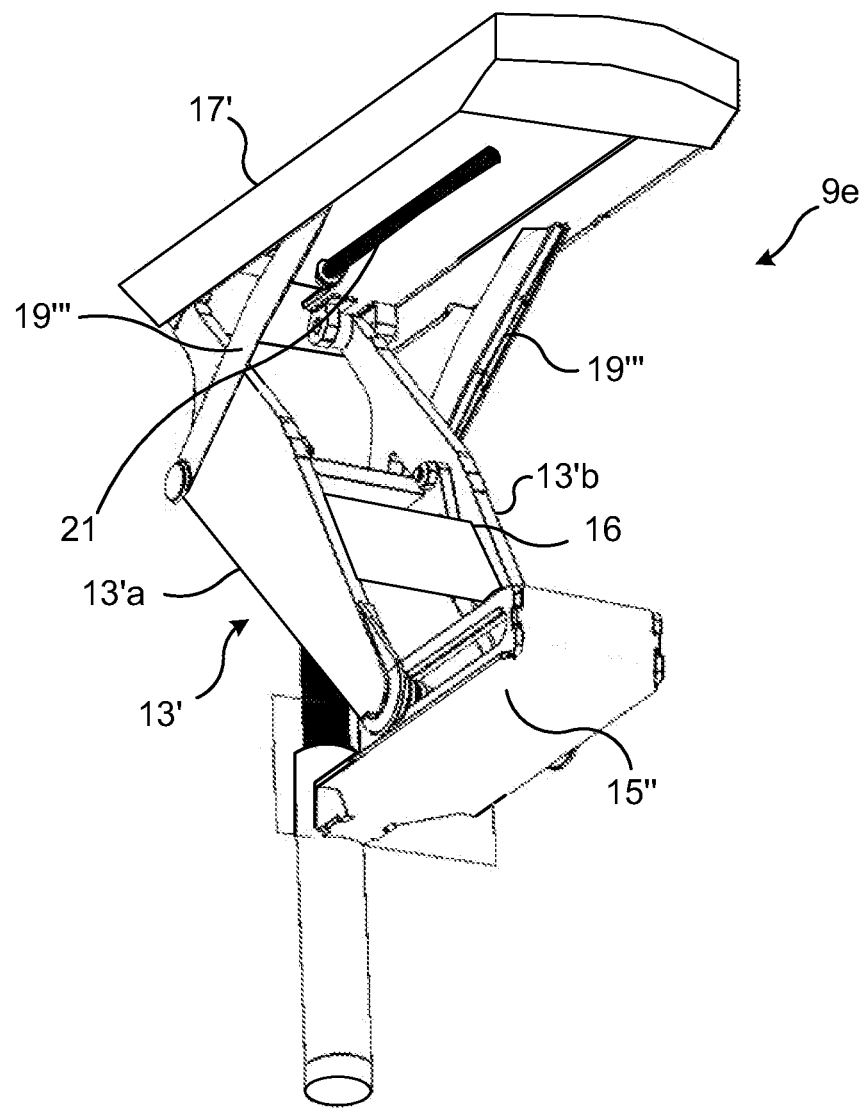

With reference to FIGS. 9a and 9b a fifth example of a tilt arrangement is shown. FIG. 9a depicts a perspective view of a tilt arrangement 9e. Tilt arrangement 9e is similar to tilt arrangement 9c'. However, first arm 13' comprises two arm parts, namely a first arm part 13'b and a second arm part 13'c. According to the example, the first arm part 13'b and the second arm part 13'c are essentially parallel and each extend between a second arm 15'' and the tilt frame 17'.

Each of the first arm part 13'a and the second arm part 13'b of the first arm 13' is pivotally coupled to the tilt frame 17' and slidably connected to a second arm 15''. Each of the first arm part 13'a and the second arm part 13'b has a slot interaction member 13'a slidably arranged in a slot 15''c such that the first arm 13 may slide between the two ends of the slot 15''c. Moreover, the tilt arrangement 9e comprises a two distancing members 19''', each being pivotally coupled to a respective one of the first arm part 13'b and the second arm part 13'c. Each distancing member 19''' is furthermore pivotally coupled to a standing actuator 21 arranged in the tilt frame 17', as shown in FIG. 9b.

Furthermore, optionally the tilt arrangement 9e may comprise a reinforcement member 16 extending between the first arm part 13'b and the second arm part 13'c. The reinforcement member 16 is arranged along a section of the first arm 13' which extends between a pivotal connection of the first arm part 13'b and the second arm part 13'c with the lifting member 11b and the slot interaction members 13'a.

The fifth example is hence similar to the first three examples. However, according to the fifth example the first arm is defined by two arm parts instead of one, and the second arm is adapted to be in slidable connection with both of the arm parts. It should however be noted that any of the previous examples may according to variations thereof have two arm parts instead of one and a second arm adapted to interact with the two arms in the manner described according to the fifth example. FIG. 9b depicts a perspective view from below of the tilt arrangement 9e in FIG. 9a. The tilt frame 17' comprises standing actuator 21. The standing actuator 21 of the tilt arrangement 9e is arranged to move or translate, in a plane defined by tilt frame 17', that end of the distancing members 19''' which is pivotally coupled to the tilt frame 17', in particular to the standing actuator 21. In particular, the standing actuator is arranged in the tilt frame 17', and arranged to provide a rectilinear motion in the plane defined by the tilt frame 17' in a similar manner as has previously been described with reference to FIG. 6.

Figure 10A:
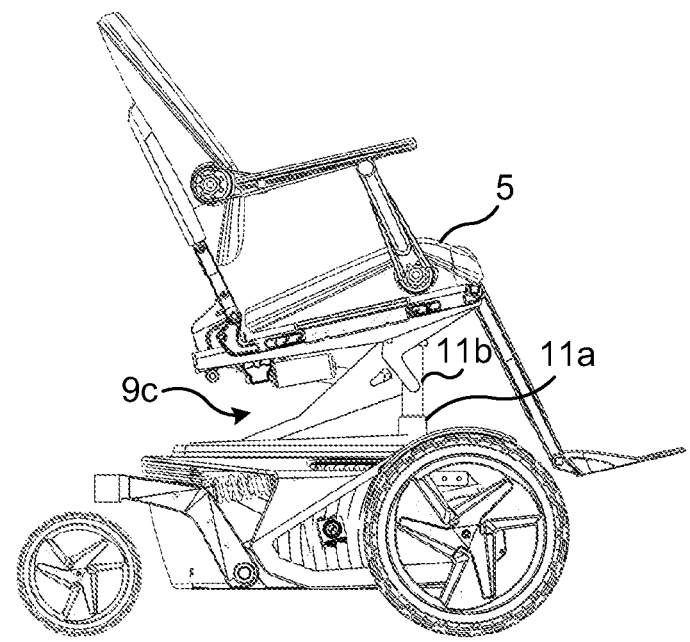
FIGS. 10a-c schematically show the wheelchair in FIG. 1 with various degrees of posterior tilt and lift, respectively.
Figure 10B:
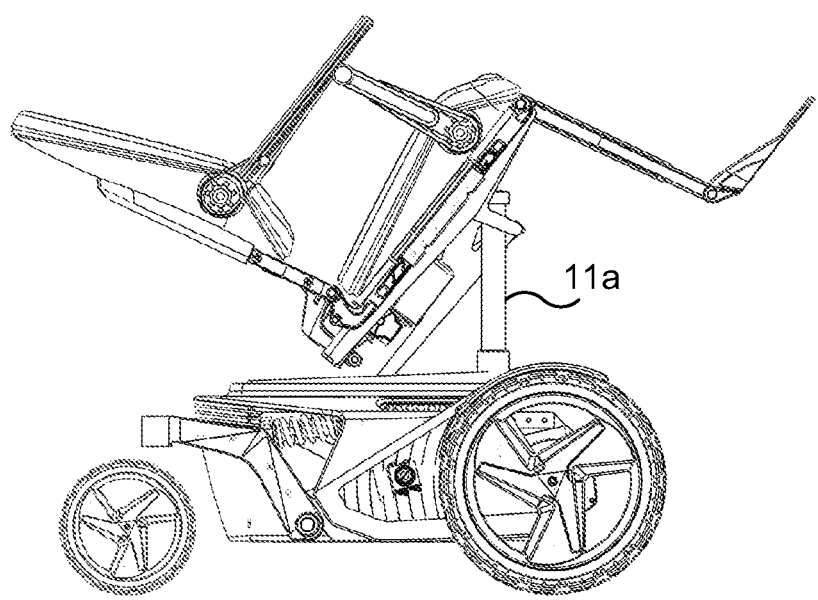
Figure 10C:
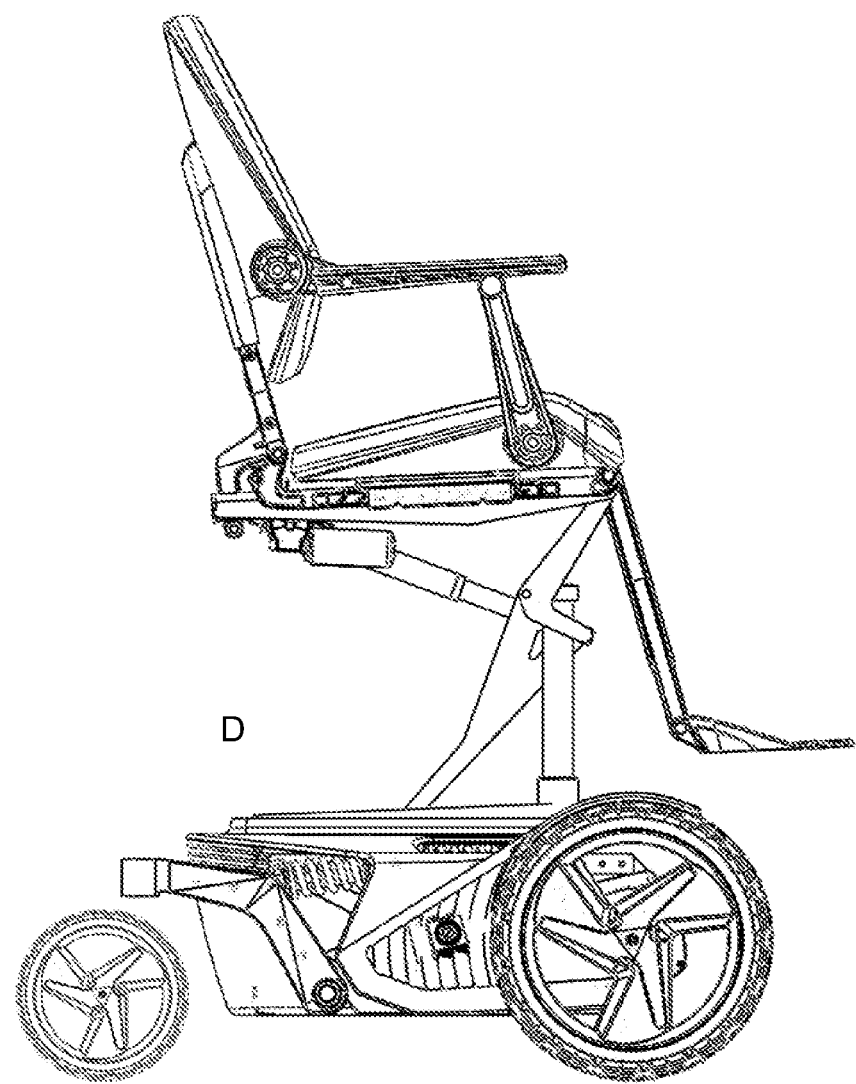

FIGS. 10a-c show schematic side views of an electric wheelchair 1 comprising a tilt arrangement. Although any of the herein presented examples of tilt arrangements may be utilised, the examples of an electric wheelchair provided in FIGS. 10a-c comprise a tilt arrangement 9c. In FIG. 10a the tilt frame, and thus the seat 5, is slightly posteriorly tilted. As the lifting member 11b is successively extended, the slot interaction member is moved closer to the base member 11a, and the tilt is increased, as shown in FIG. 10b. FIG. 10c illustrates the elevated or lifted state D of the tilt arrangement 9c, as described with reference to FIG. 5c.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:
1. An electric wheelchair comprising:
a chassis,
a lift device having a base member which is fixedly arranged to the chassis, and a lifting member arranged to move rectilinearly relative to the base member along an axis defined by a longitudinal extension of the lifting member, wherein the lifting member is arranged to move vertically between a retracted position and an extended position,
a tilt frame,
a first arm pivotally coupled to the lifting member and the tilt frame, wherein the first arm is pivotally coupled to the lifting member by a first pivotal coupling and the first arm is pivotally coupled to the tilt frame by a second pivotal coupling, and wherein a pivot axis defined by the first pivotal coupling is perpendicular to and offset from the axis defined by the longitudinal extension of the lifting member, and a second arm coupled to the base member, and the second arm is pivotally coupled to the first arm forming a pivot connection, wherein movement of the lifting member towards the extended position moves the pivot connection towards the base member and movement of the lifting member towards the retracted position moves the pivot connection away from the base member.

2. The electric wheelchair as claimed in claim 1, wherein the first pivotal coupling and the second pivotal coupling are spaced apart.

3. The electric wheelchair as claimed in claim 1, comprising a distancing member arranged to distance the first arm from the tilt frame.

4. The electric wheelchair as claimed in claim 3, wherein the distancing member is pivotally coupled to the first arm.

5. The electric wheelchair as claimed in claim 3, wherein the distancing member is pivotally coupled to the tilt frame.

6. The electric wheelchair as claimed in claim 3, wherein the distancing member is a tilt actuator extendable to increase the distance between the first arm and the tilt frame.

7. The electric wheelchair as claimed in claim 3, comprising a standing actuator arranged to move, in a plane defined by the tilt frame, an end of the distancing member which is coupled to the tilt frame.

8. The electric wheelchair as claimed in claim 1, wherein the first arm forms a linkage comprising a first portion and a second portion, wherein the first portion extends between the pivot connection with the second arm and the first pivotal coupling with the lifting member, and the second portion extends between the first pivotal coupling with the lifting member and the second pivotal coupling with the tilt frame.

9. The electric wheelchair as claimed in claim 8, wherein the first portion only extends at a first side of the axis defined by the longitudinal extension of the lifting member.

10. The electric wheelchair as claimed in claim 8, wherein the second portion intersects the axis defined by the longitudinal extension of the lifting member.

11. The electric wheelchair as claimed in claim 1, wherein the first arm is coupled to the lifting member at an end portion of the lifting member.

12. The electric wheelchair as claimed in claim 1, wherein the second arm is fixedly arranged to the base member.

13. The electric wheelchair as claimed in claim 1, wherein the pivot connection between the first arm and the second arm is defined by a slidable connection.

14. The electric wheelchair as claimed in claim 1, wherein the first arm comprises a first arm part and a second arm part, wherein each of the first arm part and the second arm part is pivotally coupled to the lifting member and the tilt frame, and to the second arm to thereby form the pivot connection.

15. An electric wheelchair comprising:
a chassis,
a lift device having a base member which is fixedly arranged to the chassis, and a lifting member arranged to move rectilinearly relative to the base member along an axis defined by a longitudinal extension of the lifting member, wherein the lifting member is arranged to move vertically between a retracted position and an extended position,
a tilt frame,
a first arm pivotally coupled to the lifting member and the tilt frame, and
a second arm coupled to the base member, wherein the second arm is fixedly arranged to the base member, and the second arm is pivotally coupled to the first arm forming a pivot connection, wherein movement of the lifting member towards the extended position moves the pivot connection towards the base member and movement of the lifting member towards the retracted position moves the pivot connection away from the base member.

16. The electric wheelchair as claimed in claim 15, wherein the first arm is pivotally coupled to the lifting member by a first pivotal coupling and the first arm is pivotally coupled to the tilt frame by a second pivotal coupling.

17. The electric wheelchair as claimed in claim 16, wherein the first pivotal coupling and the second pivotal coupling are spaced apart.

18. The electric wheelchair as claimed in claim 16, wherein the first arm forms a linkage comprising a first portion and a second portion, wherein the first portion extends between the pivot connection with the second arm and the first pivotal coupling with the lifting member, and the second portion extends between the first pivotal coupling with the lifting member and the second pivotal coupling with the tilt frame.

19. The electric wheelchair as claimed in claim 18, wherein the first portion only extends at a first side of the axis defined by the longitudinal extension of the lifting member.

20. The electric wheelchair as claimed in claim 18, wherein the second portion intersects the axis defined by the longitudinal extension of the lifting member.

21. The electric wheelchair as claimed in claim 15, comprising a distancing member arranged to distance the first arm from the tilt frame.

22. The electric wheelchair as claimed in claim 21, wherein the distancing member is pivotally coupled to the first arm.

23. The electric wheelchair as claimed in claim 21, wherein the distancing member is pivotally coupled to the tilt frame.

24. The electric wheelchair as claimed in claim 21, wherein the distancing member is a tilt actuator extendable to increase the distance between the first arm and the tilt frame.

25. The electric wheelchair as claimed in claim 21, comprising a standing actuator arranged to move, in a plane defined by the tilt frame, an end of the distancing member which is coupled to the tilt frame.

26. The electric wheelchair as claimed in claim 15, wherein the first arm is coupled to the lifting member at an end portion of the lifting member.

27. The electric wheelchair as claimed in claim 15, wherein the pivot connection between the first arm and the second arm is defined by a slidable connection.

28. The electric wheelchair as claimed in claim 15, wherein the first arm comprises a first arm part and a second arm part, wherein each of the first arm part and the second arm part is pivotally coupled to the lifting member and the tilt frame, and to the second arm to thereby form the pivot connection.

29. An electric wheelchair comprising:
a chassis,
a lift device having a base member which is fixedly arranged to the chassis, and a lifting member arranged to move rectilinearly relative to the base member along an axis defined by a longitudinal extension of the lifting member, wherein the lifting member is arranged to move vertically between a retracted position and an extended position, a tilt frame, a first arm pivotally coupled to the lifting member and the tilt frame, a second arm coupled to the base member, and the second arm is pivotally coupled to the first arm forming a pivot connection, wherein movement of the lifting member towards the extended position moves the pivot connection towards the base member and movement of the lifting member towards the retracted position moves the pivot connection away from the base member, a distancing member arranged to distance the first arm from the tilt frame, and a standing actuator arranged to move, in a plane defined by the tilt frame, an end of the distancing member which is coupled to the tilt frame.

30. The electric wheelchair as claimed in claim 29, wherein the first arm is pivotally coupled to the lifting member by a first pivotal coupling and the first arm is pivotally coupled to the tilt frame by a second pivotal coupling.

31. The electric wheelchair as claimed in claim 30, wherein the first pivotal coupling and the second pivotal coupling are spaced apart.

32. The electric wheelchair as claimed in claim 30, wherein the first arm forms a linkage comprising a first portion and a second portion, wherein the first portion extends between the pivot connection with the second arm and the first pivotal coupling with the lifting member, and the second portion extends between the first pivotal coupling with the lifting member and the second pivotal coupling with the tilt frame.

33. The electric wheelchair as claimed in claim 32, wherein the first portion only extends at a first side of the axis defined by the longitudinal extension of the lifting member.

34. The electric wheelchair as claimed in claim 32, wherein the second portion intersects the axis defined by the longitudinal extension of the lifting member.

35. The electric wheelchair as claimed in claim 29, wherein the first arm is coupled to the lifting member at an end portion of the lifting member.

36. The electric wheelchair as claimed in claim 29, wherein the distancing member is pivotally coupled to the first arm.

37. The electric wheelchair as claimed in claim 29, wherein the distancing member is pivotally coupled to the tilt frame.

38. The electric wheelchair as claimed in claim 29, wherein the distancing member is a tilt actuator extendable to increase the distance between the first arm and the tilt frame.

39. The electric wheelchair as claimed in claim 29, wherein the pivot connection between the first arm and the second arm is defined by a slidable connection.

40. The electric wheelchair as claimed in claim 29, wherein the first arm comprises a first arm part and a second arm part, wherein each of the first arm part and the second arm part is pivotally coupled to the lifting member and the tilt frame, and to the second arm to thereby form the pivot connection.

* * * * *